United States Patent Office 3,388,095
Patented June 11, 1968

3,388,095
STABILIZED POLY(2,6-DIMETHYL-1,4-PHENYLENE)ETHER
Franciscus J. Huntjens, Arnhem, Netherlands, assignor to N.V. Polychemie AKU-GE, Arnhem, Netherlands, a corporation of the Netherlands
No Drawing. Filed Apr. 12, 1966, Ser. No. 541,959
Claims priority, application Netherlands, June 15, 1965, 6,507,599
2 Claims. (Cl. 260—45.8)

ABSTRACT OF THE DISCLOSURE

A poly(2,6 - dimethyl - 1,4 - phenylene)ether stabilized against oxidative attack with from 0.1 to 2.0% 2-mercaptobenzimidazole.

---

This invention relates to a stabilized poly(2,6-dimethyl-1,4-phenylene)ether composition.

Poly(2,6-dimethyl-1,4-phenylene)ether is one of a number of polyphenylene ethers disclosed and claimed in copending U.S. Patents Nos. 3,306,874 and 3,306,875 incorporated herein by reference. These polymers possess a unique combination of electrical, chemical and physical properties over a board temperature range, and are suitable for a wide variety of commercial uses. However, their use has been somewhat impaired due to high temperature instability. In particular, the polymer has been subject to embrittlement and discoloration when exposed to elevated temperatures in the presence of oxygen. Considerable effort has been expended to find a stabilizer system capable of preventing degradation of the polymer due to thermal aging.

A large body of literature has been collected on the subject of stabilizers which prevent changes in thermoplastics. One article dealing with this subject entitled, "Stabilizers," is presented by Gerry P. Mack, Modern Plastics Encyclopedia for 1964, September 1963, vol. 41, No. 1a, pp. 405–409.

In U.S. Patent No. 2,630,421, the use of 2-mercaptobenzimidazole is disclosed as useful in the stabilization of polyamides. It has now been found that 2-mercaptobenzimidazole is an effective stabilizer for poly(2,6-dimethyl-1,4-phenylene)ether. This is particularly surprising as there is no well accepted theory concerning the manner in which stabilizers function and there is no predictability as to how a stabilizer for one polymer will function in another very similar polymer. For example, known phenolic anti-oxidants such as p-phenylphenol, N-stearoyl-p-aminophenol and 2,2'-methylenebis(4-ethyl-6-tert. butylphenol), are not effective stabilizers for poly(2,6-dimethyl-1,4-phenylene)ether and no appreciable difference is realized in oxygen resistance between a poly(2,6-dimethyl-1,4-phenylene)ether containing such an anti-oxidant and a polyether free of such anti-oxidants. In addition, those anti-oxidants having ester groups, such as dilaurylthiodipropionate, known to be effective with the phenolic resins, prove to be ineffective with poly(2,6-dimethyl-1,4-phenylene)ether. Other known anti-oxidants have also been found to be ineffective.

Accordingly, an object of this invention is to provide a composition consisting of a major portion of a poly(2,6-dimethyl-1,4-phenylene)ether and a minor portion of a 2-mercaptobenzimidazole having a resistance to oxygen attack that is several times higher than that of the unstabilized poly(2,6-dimethyl-1,4-phenylene)ether.

Other objects and advantages of this invention will be in part apparent and in part pointed out in the description which follows.

The quantity of 2-mercaptobenzimidazole which may be added to the poly(2,6-dimethyl-1,4-phenylene)ether to obtain good results may range between 0.1 to 2% by weight of the total composition. Particularly favorable results are obtained if the amount of 2-mercaptobenzimidazole is approximately 1% by weight and this quantity constitutes a preferred embodiment of this invention. In general, when the quantity of stabilizer exceeds 2% by weight, no further improvement in stability properties are realized.

The manner of adding the 2-mercaptobenzimidazole to the poly(2,6-dimethyl-1,4-phenylene)ether is not critical and any manner known to those skilled in the art may be employed. For example, the stabilizer may be added to a melt or solution of the polymer before the polymer is formed into shaped articles. Alternatively, the 2-mercaptobenzimidazole may be distributed over the powdered or granulated polymer which is subsequently dissolved or melted to form shaped articles. A preferred method for adding the 2-mercaptobenzimidazole to the polymer comprises mixing a solution of the stabilizer in a volatile solvent with the polymer in powder form and subsequently evaporating the solvent. The polymer and stabilizer should be mutually soluble in the solvent and the solvent should be non-reactive therewith. Preferred solvents for this purpose include acetone and dioxane. Stabilized poly(2,6-dimethyl-1,4-phenylene)ether and compositions made therefrom, such as spinning solutions, melts and the like may be used in all the fields that have already been proposed for such materials such as in electrical engineering, as material in the manufacture of extrusion and injection moulded articles and as starting material in the manufacture of fibers and films. The following example is illustrative of one embodiment of this invention, but is not to be construed as limiting in any way. All percentages expressed in the example are by weight unless otherwise indicated.

Example

This example shows the stability of a poly(2,6-dimethyl-1,4-phenylene)ether containing 2-mercaptobenzimidazole and compares the stability of this material with the poly(2,6-dimethyl-1,4-phenylene) ether containing known antioxidants.

In all cases, the stabilizer was added to the polymer by dissolving it in acetone or dioxane, mixing the solution with polymer in powder form and subsequently evaporating the solvent. The stabilizer was added in an amount of 1%. The polymer containing the various stabilizers were made into film strips having a thickness of 250 microns by pressing the polymer powder between two metal plates which were heated to 270° C. The film strips were thereafter placed in a drying oven maintained at 150° C. in an air atmosphere. The film flexibility was measured at various times by first folding the film strips through 180° and strongly pressing together the folded halves between the thumb and index finger. Subsequently, one half of the strip was folded back through 360°, but this time the two halves were not pressed together. The latter bending operation was repeated until the strip broke. The total number of foldings required to break the strip is used to indicate the folding number which is a measurement of the embrittlement of freedom from embrittlement of the film. The following results were obtained.

TABLE 1.—EFFECT OF VARIOUS STABILIZERS ON EMBRITTLEMENT OF POLY(2,6-DIMETHYL-1,4-DIMETHYLPHENYLENE)-ETHER

| Additives | Folding number after— | | | |
|---|---|---|---|---|
| | 0 hours | 72 hours | 100 hours | 170 hours |
| Control | 30 | 8 | 6 | 2 |
| 2-mercaptobenzimidazole | 30 | 20 | 12 | 7 |
| N-stearoyl-p-aminophenol | 24 | 3 | 3 | 1 |
| p-Phenylphenol | 24 | 5 | 2 | 1 |
| 2,5-di(tert. amyl)hydroquinone | 28 | 5 | 5 | 1 |
| 4,4'-dihydroxydiphenyl | 31 | 4 | 3 | 1 |
| 2,6-ditert. butyl p-cresol | 26 | 6 | 5 | 1 |
| 2,2'-methylene bis (4-ethyl-6 tert. butylphenol) | 30 | 4 | 3 | 1 |
| 2,2'-thiobis(4-methyl-6 tert. butylphenol) | 30 | 6 | 5 | 3 |
| Thiobis (di sec. amylphenol) | 28 | 5 | 4 | 2 |
| Naphthylamine | 26 | 5 | 4 | 2 |
| 4-isopropylaminodiphenylamine | 22 | 9 | 6 | 4 |
| Phenyl-P-apthylamine | 32 | 8 | 6 | 3 |
| Phenylcyclohexyl-p-phenylene-diamine | 31 | 8 | 6 | 4 |
| N,N' di-β-naphthyl-p-phenylene diamine | 26 | 9 | 6 | 4 |
| N,N'-di-octyl-p-phenylene diamine | 32 | 5 | 3 | 2 |
| β-(p-Tolylsulphonylamine) diphenylamine | 29 | 5 | 4 | 2 |
| Nickeldibutyldithiocarbamate | 33 | 6 | 5 | 3 |
| Dilaurylthiodipropionate | 29 | 4 | 3 | 2 |
| 2-(2'-hydroxy-5'-methylphenyl) benzotriazole | 22 | 4 | 4 | 1 |
| 6-ethoxy-1,2-dihydro-2,4-trimethylquinoline | 28 | 5 | 3 | 2 |
| β-Thionaphthol | 24 | 7 | 4 | 2 |
| Acetylcaprolactam | 27 | 5 | 3 | 2 |
| Phthalimide | 22 | 6 | 3 | 2 |

From the table it is clear that the resistance to oxygen of the poly(2,6-dimethyl-1,4-phenylene)ether stabilized with 2-mercapto benzimidazole is several times higher than that of the polyether free of stabilizer or the polyether stabilized with anti-oxidants known to those skilled in the art.

Whereas the foregoing is described with reference to certain specific embodiments, it would, of course, be apparent to those skilled in the art that changes may be made in the particular embodiments of the invention described which are within the full intent and scope of the invention as defined by the appended claims.

What I claim as new and desire to secure by Letters Patent of the United States is:

1. A composition consisting of poly(2,6-dimethyl-1,4-phenylene)ether and from 0.1 to 2% by weight, 2-mercaptobenzimidazole.

2. The composition of claim 1 wherein the 2-mercaptobenzimidazole constitutes approximately 1% by weight of the entire composition.

References Cited

UNITED STATES PATENTS 2,848,437  8/1958  Langsdorf et al. __ 260—45.8 X

DONALD E. CZAJA, *Primary Examiner.*

M. J. WELSH, *Assistant Examiner.*